United States Patent
Sundaresan

(10) Patent No.: US 12,315,253 B2
(45) Date of Patent: May 27, 2025

(54) USE OF CAMERA METADATA FOR RECOMMENDATIONS

(71) Applicant: eBay Inc., San Jose, CA (US)

(72) Inventor: Neelakantan Sundaresan, Mountain View, CA (US)

(73) Assignee: eBay Inc., San Jose, CA (US)

( * ) Notice: Subject to any disclaimer, the term of this patent is extended or adjusted under 35 U.S.C. 154(b) by 0 days.

(21) Appl. No.: 18/644,053

(22) Filed: Apr. 23, 2024

(65) Prior Publication Data

US 2024/0312207 A1    Sep. 19, 2024

Related U.S. Application Data

(63) Continuation of application No. 18/202,814, filed on May 26, 2023, now Pat. No. 12,002,264, which is a (Continued)

(51) Int. Cl.
| | |
|---|---|
| G06Q 30/00 | (2023.01) |
| G06F 16/58 | (2019.01) |
| G06F 16/9535 | (2019.01) |
| G06F 16/9538 | (2019.01) |
| G06Q 30/0601 | (2023.01) |
| G06T 7/00 | (2017.01) |
| G06V 20/20 | (2022.01) |

(52) U.S. Cl.
CPC ............ *G06V 20/20* (2022.01); *G06F 16/58* (2019.01); *G06F 16/9535* (2019.01); *G06F 16/9538* (2019.01); *G06Q 30/0631* (2013.01); *G06T 7/00* (2013.01); *G06T 2207/10004* (2013.01); *G06T 2207/10016* (2013.01)

(58) Field of Classification Search
CPC .............................................. G06Q 30/06–08
See application file for complete search history.

(56) References Cited

U.S. PATENT DOCUMENTS

| 8,484,099 B1 | 7/2013 | Pope et al. |
| 10,248,862 B2 | 4/2019 | Sundaresan |
| (Continued) | | |

FOREIGN PATENT DOCUMENTS

| KR | 20090107907 | 10/2009 |
| KR | 20130108673 | 10/2013 |
| (Continued) | | |

OTHER PUBLICATIONS

"Kofax Releases VirtualReScan 4.0", KMWorld 14.6: 28, Knowledge Asset Media, Jun. 2005 (Year: 2005).*

(Continued)

*Primary Examiner* — Ethan D Civan
(74) *Attorney, Agent, or Firm* — FIG. 1 Patents

(57) ABSTRACT

In various example embodiments, a system and method for using camera metadata for making recommendations are presented. At least one image file having camera metadata is received. The camera metadata of the at least one image file is analyzed to determine improvements to image capture aspects associated with the at least one image file. Feedback related to the improvements to the image capture aspects associated with the at least one image file is generated. In some embodiments, the feedback may be used to generate camera and other product upgrade recommendations.

20 Claims, 12 Drawing Sheets

Related U.S. Application Data continuation of application No. 16/282,658, filed on Feb. 22, 2019, now Pat. No. 11,704,905, which is a continuation of application No. 14/339,358, filed on Jul. 23, 2014, now Pat. No. 10,248,862.

(56) References Cited

U.S. PATENT DOCUMENTS

| | | |
|---|---|---|
| 11,704,905 B2 | 7/2023 | Sundaresan |
| 12,002,264 B2 | 6/2024 | Sundaresan |
| 2004/0174434 A1 | 9/2004 | Walker et al. |
| 2006/0239674 A1 | 10/2006 | Manson et al. |
| 2008/0022384 A1 | 1/2008 | Yee et al. |
| 2008/0158366 A1 | 7/2008 | Jung et al. |
| 2009/0016565 A1* | 1/2009 | Kulumani ............. G06Q 10/00 707/999.107 |
| 2009/0160970 A1 | 6/2009 | Fredlund et al. |
| 2010/0036883 A1 | 2/2010 | Valencia-Campo et al. |
| 2010/0050107 A1 | 2/2010 | Mcintyre et al. |
| 2011/0235858 A1 | 9/2011 | Hanson et al. |
| 2012/0197764 A1 | 8/2012 | Nuzzi et al. |
| 2012/0229655 A1 | 9/2012 | Solomon |
| 2013/0212094 A1 | 8/2013 | Naguib et al. |
| 2013/0286234 A1 | 10/2013 | Hussain |
| 2013/0321245 A1 | 12/2013 | Harper |
| 2014/0049652 A1 | 2/2014 | Moon et al. |
| 2014/0074866 A1 | 3/2014 | Shah et al. |
| 2014/0139692 A1* | 5/2014 | Resende ............. H04N 23/6812 348/208.1 |
| 2014/0139704 A1 | 5/2014 | Boss et al. |
| 2014/0270332 A1 | 9/2014 | Pacifici |
| 2014/0372183 A1 | 12/2014 | Groble et al. |
| 2015/0054975 A1 | 2/2015 | Emmett et al. |
| 2015/0286898 A1 | 10/2015 | Di et al. |
| 2015/0293592 A1 | 10/2015 | Cheong et al. |
| 2015/0350536 A1 | 12/2015 | Yajima |
| 2016/0026866 A1 | 1/2016 | Sundaresan |
| 2019/0188476 A1 | 6/2019 | Sundaresan |
| 2023/0306737 A1 | 9/2023 | Sundaresan |

FOREIGN PATENT DOCUMENTS

| | | |
|---|---|---|
| KR | 20140023705 | 2/2014 |
| WO | WO-2016014657 | 1/2016 |

OTHER PUBLICATIONS 10-2017-7005058, , "Final Office Action received for Korean Patent Application No. 10-2017-7005058, mailed on Aug. 16, 2018", Aug. 16, 2018, 6 pages.
10-2017-7005058, , "Office Action received for Korean Patent Application No. 10-2017-7005058, mailed on Aug. 31, 2017", Aug. 31, 2017, 12 pages.
10-2017-7005058, , "Office Action received for Korean Patent Application No. 10-2017-7005058, mailed on May 16, 2018", May 16, 2018, 6 pages.
10-2017-7005058, , "Trial Board Decision received for Korean Patent Application No. 10-2017-7005058, mailed on Nov. 15, 2019", Nov. 15, 2019, 47 pages.
10-2018-7029885, , "Notice of Allowance received for Korean Patent Application No. 10-2018-7029885, mailed on Jan. 25, 2022", Jan. 25, 2022, 3 pages.
10-2018-7029885, , "Office Action received for Korean Patent Application No. 10-2018-7029885 mailed on Mar. 30, 2021", Mar. 30, 2021, 4 pages.
10-2018-7029885, , "Office Action received for Korean Patent Application No. 10-2018-7029885, mailed on Jul. 5, 2021", Jul. 5, 2021, 8 pages.
10-2018-7029885, , "Office Action Received for Korean Patent Application No. 10-2018-7029885, mailed on Sep. 11, 2020", Sep. 11, 2020, 10 pages.
U.S. Appl. No. 14/339,358, , "Advisory Action received for U.S. Appl. No. 14/339,358, mailed on Sep. 28, 2018", Sep. 28, 2018, 3 pages.
U.S. Appl. No. 14/339,358, , "Final Office Action received for U.S. Appl. No. 14/339,358 , mailed on Jun. 14, 2018", Jun. 14, 2018, 20 pages.
U.S. Appl. No. 14/339,358, , "Final Office Action received for U.S. Appl. No. 14/339,358, mailed on Aug. 9, 2017", Aug. 9, 2017, 16 pages.
U.S. Appl. No. 14/339,358, , "Non-Final Office Action Received for U.S. Appl. No. 14/339,358, mailed on Feb. 10, 2017", Feb. 10, 2017, 15 pages.
U.S. Appl. No. 14/339,358, , "Non-Final Office Action Received for U.S. Appl. No. 14/339,358, mailed on Oct. 4, 2017", Oct. 4, 2017, 15 pages.
U.S. Appl. No. 14/339,358, , "Notice of Allowability received for U.S. Appl. No. 14/339,358 , mailed on Dec. 28, 2018", Dec. 28, 2018, 4 pages.
U.S. Appl. No. 14/339,358, , "Notice of Allowance received for U.S. Appl. No. 14/339,358, mailed on Nov. 15, 2018", Nov. 15, 2018, 15 pages.
15824946.6, , "Brief Communication Received for European Patent Application No. 15824946.6, mailed on Mar. 4, 2022", Mar. 4, 2022, 4 pages.
15824946.6, , "Communication Pursuant To Article 94(3) EPC received for European Patent Application No. 15824946.6, mailed on Jan. 20, 2021", Jan. 20, 2021, 7 pages.
15824946.6, , "EPO Decision to refuse Received for European Patent Application No. 15824946.6, mailed on May 6, 2022", May 6, 2022, 13 pages.
15824946.6, , "Extended European Search Report received for European Patent Application No. 15824946.6 mailed on Jan. 3, 2018", Jan. 3, 2018, 7 pages.
15824946.6, , "Summons to Attend Oral proceedings Received for European Patent Application No. 15824946.6 , mailed on Oct. 21, 2021", Oct. 21, 2021, 10 pages.
U.S. Appl. No. 16/282,658, , "Non Final Office Action Received for U.S. Appl. No. 16/282,658, mailed on Mar. 30, 2022", Mar. 30, 2022, 18 pages.
U.S. Appl. No. 16/282,658, , "Notice of Allowance Received for U.S. Appl. No. 16/282,658, mailed on Mar. 1, 2023", Mar. 1, 2023, 9 pages.
U.S. Appl. No. 18/202,814, , "Non-Final Office Action", U.S. Appl. No. 18/202,814, Jan. 18, 2024, 7 pages.
U.S. Appl. No. 18/202,814, , "Notice of Allowance", U.S. Appl. No. 18/202,814, Mar. 14, 2024, 5 pages.
PCT/US2015/041519, , "International Preliminary Report on Patentability received for PCT Application No. PCT/US2015/041519, mailed on Feb. 2, 2017", Feb. 2, 2017, 8 pages.
PCT/US2015/041519, , "International Search Report received for PCT Patent Application No. PCT/US2015/041519, mailed on Oct. 9, 2015", Oct. 9, 2015, 2 pages.
PCT/US2015/041519, , "International Written Opinion received for PCT Patent Application No. PCT/US2015/041519, mailed on Oct. 9, 2015", Oct. 9, 2015, 6 pages.
Wikipedia, , "Timeline of Instagram", Retrieved from the Internet URL: <https://en.wikipedia.org/wiki/Timeline_of_Instagram>, Dec. 17, 2021, 8 pages.

* cited by examiner

| Tag 451 | Value 452 |
|---|---|
| Manufacturer | CASIO |
| Model | QV-4000 |
| Orientation (rotation) | top - left |
| Software | Ver1.01 |
| Date and Time | 2004:09:11 16:55:32 |
| YCbCr Positioning | centered |
| Compression | JPEG compression |
| x-Resolution | 72.00 |
| y-Resolution | 72.00 |
| Resolution Unit | Inch |
| Exposure Time | 1/659 sec |
| FNumber | f/4.0 |
| ExposureProgram | Normal program |
| Exif Version | Exif Version 2.1 |
| Date and Time (original) | 2004:09:11 16:55:32 |
| Date and Time (digitized) | 2004:09:11 16:55:32 |
| ComponentsConfiguration | Y Cb Cr - |
| Compressed Bits per Pixel | 4.01 |
| Exposure Bias | 0.0 |
| MaxAperture Value | 2.00 |
| Metering Mode | Pattern |
| Flash | Flash did not fire. |
| Focal Length | 20.1 mm |
| MakerNote | 432 bytes unknown data |
| FlashPixVersion | FlashPix Version 1.0 |
| Color Space | sRGB |
| PixelXDimension | 2240 |
| PixelYDimension | 1680 |
| File Source | DSC |

| Tag 461 | Value 462 |
|---|---|
| Encoding | Microsoft PCM |
| Num Channels | 1 |
| Sample Rate | 7872 |
| Avg Bytes Per Sec | 7872 |
| Bits Per Sample | 8 |
| Date Created | 2006:12:08 |
| Exif Version | 0220 |
| Related Image File | IMGP1149.JPG |
| Time Created | 12:20:39 |
| Make | PENTAX Corporation |
| Model | PENTAX Optio WP |
| MakerNote | (2064 bytes of data) |

FIG. 4C

USE OF CAMERA METADATA FOR RECOMMENDATIONS

RELATED APPLICATIONS

This application is a continuation of U.S. patent application Ser. No. 18/202,814, filed May 26, 2023, entitled "Use of Camera Metadata for Recommendations", which is a continuation of U.S. patent application Ser. No. 16/282,658, filed Feb. 22, 2019, entitled "Use of Camera Metadata for Recommendations," which is a continuation of U.S. patent application Ser. No. 14/339,358, filed Jul. 23, 2014, entitled "Use of Camera Metadata for Recommendations." The content of these prior applications are considered part of this application, and are hereby incorporated by reference in their entirety.

COPYRIGHT NOTICE

A portion of the disclosure of this patent document contains material that is subject to copyright protection. The copyright owner has no objection to the facsimile reproduction by anyone of the patent document or the patent disclosure, as it appears in the Patent and Trademark Office patent files or records, but otherwise reserves all copyright rights whatsoever. The following notice applies to the software and data as described below and in the drawings that form a part of this document: Copyright 2019, eBay Inc. All Rights Reserved.

TECHNICAL FIELD

Embodiments of the present disclosure relate generally to e-commerce, and more particularly, but not by way of limitation, to the use of camera metadata for recommendations.

BACKGROUND

In the area of online commerce, a wide variety of products are available for purchase over the Internet to consumers. A consumer, via a search or a browsing session, may identify one or more items and purchase those items. Various e-commerce systems deploy automated product recommendation systems to help consumers make a product selection more efficiently.

BRIEF DESCRIPTION OF THE DRAWINGS

Various ones of the appended drawings merely illustrate example embodiments of the present disclosure and cannot be considered as limiting its scope.

FIG. 4B illustrates an example of Exif data for a picture.

FIG. 4C illustrates an example of Exif data found in a WAV file.

DETAILED DESCRIPTION

Figure 1:
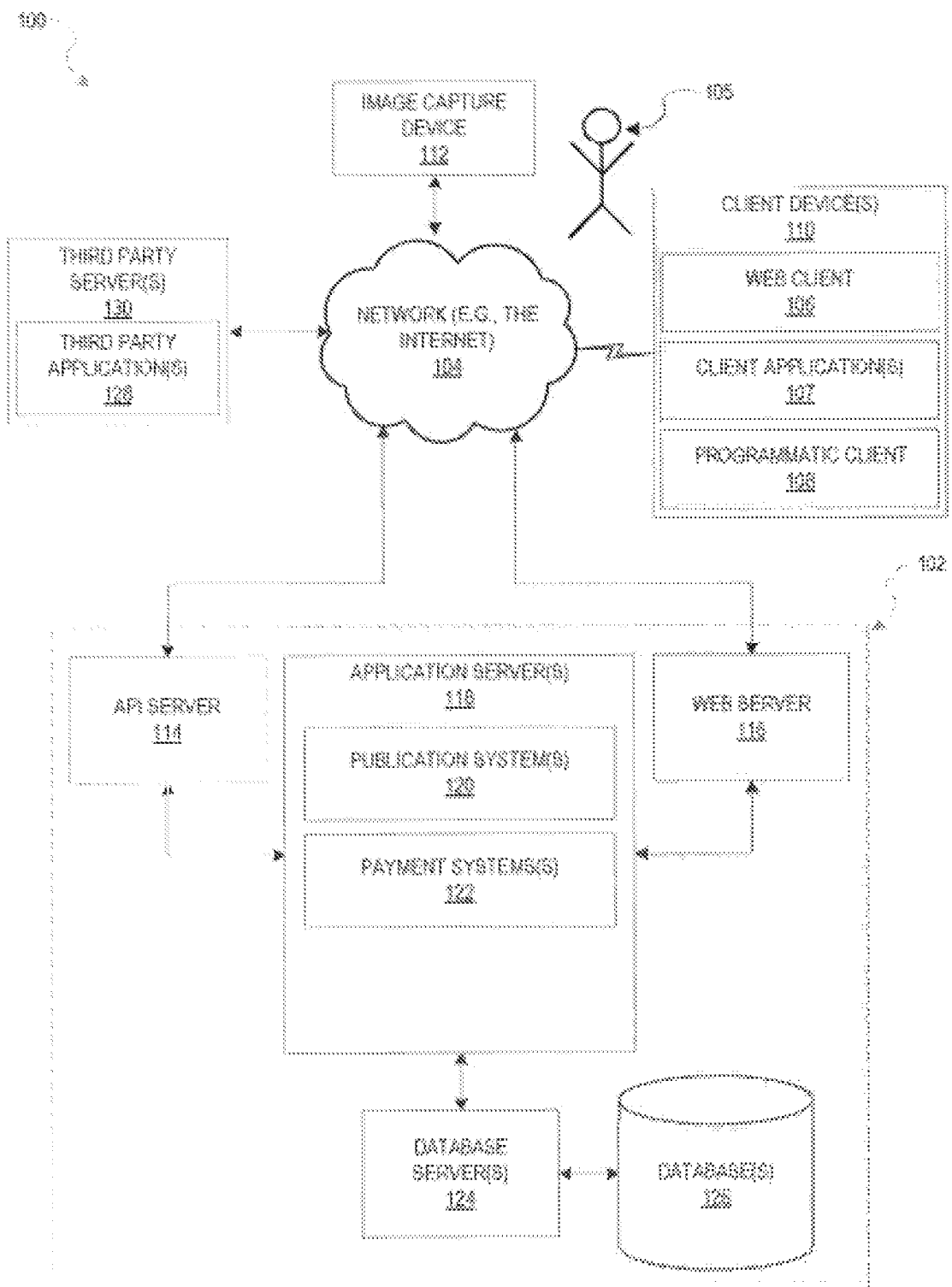
FIG. 1 is a block diagram illustrating of a high-level client-server-based network architecture, according to example embodiments.

The description that follows includes systems, methods, techniques, instruction sequences, and computing machine program products that embody illustrative embodiments of the disclosure. In the following description, for the purposes of explanation, numerous specific details are set forth in order to provide an understanding of various embodiments of the inventive subject matter. It will be evident, however, to those skilled in the art, that embodiments of the inventive subject matter may be practiced without these specific details. In general, well-known instruction instances, protocols, structures, and techniques are not necessarily shown in detail.

Additionally, although various example embodiments discussed below focus on a marketplace environment, the embodiments are given merely for clarity in disclosure. Thus, any type of electronic publication, electronic commerce, social networking, or electronic business system and method, including various system architectures, may employ various embodiments of the system and method described herein and may be considered as being within a scope of example embodiments. Each of a variety of example embodiments is discussed in detail.

Example embodiments provide systems and methods for providing feedback or recommendations to a user based on camera metadata which may be obtained from an uploaded image. Content providers, such as bloggers, a Pinterest user, a PayPal user, or an eBay seller, often upload pictures into various electronic publication, electronic commerce, social networking, or other business systems. An image file corresponding to the uploaded picture may include camera metadata. In some embodiments, the camera metadata may be defined by the Exif standard, which covers a broad spectrum of metadata tags such as date and time information, camera settings (including camera model and make), and information that varies with each image such as orientation (rotation), aperture, shutter speed, focal length, metering mode, and ISO speed information. The camera metadata retrieved or extracted from an image file may be analyzed to determine improvements when taking future pictures. For example, the improvements may relate to image capture aspects associated with picture taking (photography or videography) skills, use of camera settings, or identifying camera products and accessories that suit the user's needs. In additional embodiments, other image data, such as context data related to the environment or scene conditions, use information related to the purpose of taking the pictures, or other metadata (e.g., GPS from a mobile phone) may also be used to analyze the image file. The analyzed data may be used to provide feedback to a user. The feedback may include recommendations for product upgrades such as a camera model with more suitable features matching the user's needs, or camera accessories (e.g., lens and filters) that may help improve the quality of the pictures taken. Feedback may also include comments related to camera setting adjustments for a particular environment (e.g., time of day, location, weather conditions, orientation or direction the camera is facing, distance between the scene and the camera) or purpose (e.g., pictures taken at a wedding or sporting event).

With reference to FIG. 1, an example embodiment of a high-level client-server-based network architecture 100 is shown. A networked system 102, in the example forms of a network-based marketplace or payment system, provides server-side functionality via a network 104 (e.g., the Internet or wide area network (WAN)) to one or more client devices 110. FIG. 1 illustrates, for example, a web client 106 (e.g., a browser, such as the Internet Explorer® browser developed by Microsoft® Corporation of Redmond, Washington State), client application(s) 107, and a programmatic client 108 executing on the client device(s) 110. The client device(s) 110 may include the web client 106, the client application(s) 107, and the programmatic client 108 alone, together, or in any combination. Although FIG. 1 shows one client device 110, multiple device machines may be included in the network architecture 100.

The client device(s) 110 may comprise a computing device that includes at least a display and communication capabilities with the network 104 to access the networked system 102. The client device(s) 110 may comprise, but are not limited to, remote devices, work stations, computers, general purpose computers, Internet appliances, hand-held devices, wireless devices, portable devices, wearable computers or devices, cellular or mobile phones, portable digital assistants (PDAs), smart phones, tablets, ultrabooks, netbooks, laptops, desktops, multi-processor systems, microprocessor-based or programmable consumer electronics, game consoles, set-top boxes, network PCs, mini-computers, and the like. In further embodiments, the client device(s) 110 may comprise one or more of a touch screen, accelerometer, gyroscope, biometric sensor, camera, microphone, global positioning system (GPS) device, and the like. The client device(s) 110 may communicate with the network 104 via a wired or wireless connection. For example, one or more portions of network 104 may be an ad hoc network, an intranet, an extranet, a virtual private network (VPN), a local area network (LAN), a wireless LAN (WLAN), a wide area network (WAN), a wireless WAN (WWAN), a metropolitan area network (MAN), a portion of the Internet, a portion of the Public Switched Telephone Network (PSTN), a cellular telephone network, a wireless network, a WiFi network, a WiMax network, another type of network, or a combination of two or more such networks.

The client device(s) 110 may include one or more applications (also referred to as "apps") such as, but not limited to, a web browser, messaging application, electronic mail (email) application, an e-commerce site application (also referred to as a marketplace application), and the like. For example, the client application(s) 107 may include various components operable to present information to the user and communicate with networked system 102. In some embodiments, if the e-commerce site application is included in a given one of the client devices 110, then this application may be configured to locally provide the user interface and at least some of the functionalities with the application configured to communicate with the networked system 102, on an as needed basis, for data or processing capabilities not locally available (e.g., access to a database of items available for sale, to authenticate a user, to verify a method of payment, etc.). Conversely if the e-commerce site application is not included in a given one of the client devices 110, the given one of the client devices 110 may use its web browser to access the e-commerce site (or a variant thereof) hosted on the networked system 102.

In various example embodiments, one or more users 105 may be a person, a machine, or other means of interacting with the client device(s) 110. In example embodiments, the user 105 is not part of the network architecture 100, but may interact with the network architecture 100 via the client device(s) 110 or another means. For example, the user 105 may use an image capture device 112, such as a camera or camcorder to take pictures or videos. The pictures or videos (collectively referred to as "images") taken may have their image files transferred over the network 104 to the client device 110 or the networked system 102, for viewing or further processing. In some embodiments, the image capture device 112 may be embodied within the client device 110.

An application program interface (API) server 114 and a web server 116 may be coupled to, and provide programmatic and web interfaces respectively to, one or more application servers 118. The application servers 118 may host one or more publication systems 120 and payment systems 122, each of which may comprise one or more modules or applications and each of which may be embodied as hardware, software, firmware, or any combination thereof. The application servers 118 are, in turn, shown to be coupled to one or more database servers 124 that facilitate access to one or more information storage repositories or database(s) 126. In an example embodiment, the databases 126 are storage devices that store information to be posted (e.g., publications or listings) to the publication system 120. The databases 126 may also store digital goods information in accordance with example embodiments.

The publication system(s) 120 may provide a number of publication functions and services to the users 105 that access the networked system 102. The payment system(s) 122 may likewise provide a number of functions to perform or facilitate payments and transactions. While the publication systems 120 and payment system(s) 122 are shown in FIG. 1 to both form part of the networked system 102, it will be appreciated that, in alternative embodiments, each system 120 and 122 may form part of a payment service that is separate and distinct from the networked system 102. In some embodiments, the payment system(s) 122 may form part of the publication system(s) 120. In example embodiments, a publication system 120 may include a system for analyzing image files (or various types of media files) and providing feedback to the user 105. The feedback to the user 105 may be provided to a user device, such as the image capture device 112 or the client device 110. In some embodiments, the feedback may include product recommendations, which the user 105 may purchase through the publication system 120 (e.g., an e-commerce system) or payment system 122.

Further, while the client-server-based network architecture 100 shown in FIG. 1 employs a client-server architecture, the present inventive subject matter is, of course, not limited to such an architecture, and may equally well find application in a distributed, or peer-to-peer, architecture system, for example. The various publication systems 120 and payment systems 122 may also be implemented as standalone software programs, which do not necessarily have networking capabilities.

The web client 106 may access the various publication and payment systems 120 and 122 via the web interface supported by the web server 116. Similarly, the programmatic client 108 accesses the various services and functions provided by the publication systems 120 and payment systems 122 via the programmatic interface provided by the API server 114. The programmatic client 108 may, for example, be a seller application (e.g., the Turbo Lister application developed by eBay® Inc., of San Jose, California) to enable sellers to author and manage listings on the networked system 102 in an off-line manner, and to perform batch-mode communications between the programmatic client 108 and the networked system 102.

Additionally, a third party application(s) 128, executing on a third party server(s) 130, is shown as having programmatic access to the networked system 102 via the programmatic interface provided by the API server 114. For example, the third party application(s) 128, utilizing information retrieved from the networked system 102, may support one or more features or functions on a website hosted by the third party. The third party website may, for example, provide one or more promotional, marketplace, or payment functions that are supported by the relevant applications of the networked system 102.

Figure 2A:
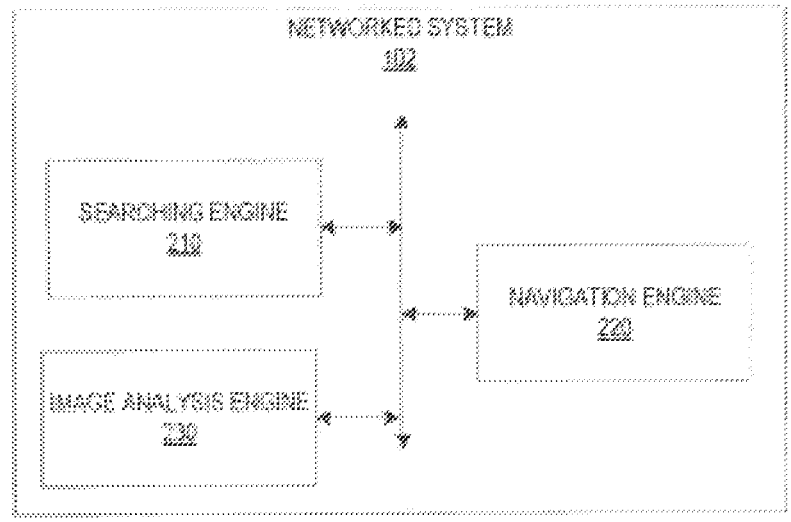
FIG. 2A is a block diagram illustrating an example embodiment of a networked system, according to example embodiments.

FIG. 2A illustrates a block diagram showing components provided within the networked system 102 according to some embodiments. The networked system 102 may be hosted on dedicated or shared server machines (not shown) that are communicatively coupled to enable communications between server machines. The components themselves may be communicatively coupled (e.g., via appropriate interfaces) to each other and to various data sources, so as to allow information to be passed between the applications or so as to allow the applications to share and access common data. Furthermore, the components may access one or more of the databases 126 via the database server(s) 124.

Searching the networked system 102 is facilitated by a searching engine 210. For example, the searching engine 210 enables keyword queries of listings published via the networked system 102. In example embodiments, the searching engine 210 receives the keyword queries from a device (e.g., the client device 110) of the user 105 and conducts a review of the storage device (e.g., databases 126) storing the listing information. The review will enable compilation of a result set of listings that may be sorted and returned to the client device (e.g., client devices 110) of the user. The searching engine 210 may record the query (e.g., keywords) and any subsequent user actions and behaviors (e.g., navigations, selections, or click-through).

The searching engine 210 also may perform a search based on a location of the user. For example, a user may access the searching engine 210 via a mobile device and generate a search query. Using the search query and the user's location, the searching engine 210 may return relevant search results for products, services, offers, auctions, and so forth to the user. The searching engine 210 may identify relevant search results both in a list form and graphically on a map. Selection of a graphical indicator on the map may provide additional details regarding the selected search result. In some embodiments, the user 105 may specify, as part of the search query, a radius or distance from the user 105's current location to limit search results. In some embodiments, the user 105 may receive feedback regarding various camera products, and search various camera products using the searching engine 210. In various embodiments, the searching engine 210, may be used to search image files based on camera metadata or other metadata tags associated with images.

In various embodiments, the networked system 102 may include an image analysis engine 230 for analyzing images, video, or other media. The image analysis engine 230 may generate feedback for a user. The feedback may be generated using camera metadata alone or in combination with other types of information or data. Camera metadata refers to a set of data that describes and provides information about images. Digital cameras may embed camera metadata information, at the time the picture is taken, that identifies capture of an image, image characterics, and more. Additionally, photographers, videographers, and other users may enhance metadata for an image, for example, information may be added to the Exif data, such as, copyright information and description information.

In various embodiments, the image analysis engine 230 may analyze camera metadata (of one or more image files) along with other metadata, which is associated with another user device (e.g., a mobile device). In other embodiments, the image analysis engine 230 may analyze the context of an image file to determine scene conditions or environmental factors (e.g., time of day, location, location of sun). In yet further embodiments, the image analysis engine 230 may analyze the purpose of taking the pictures. In various embodiments, the feedback generated by the image analysis engine 230 may analyze image files based on information derived from a number of sources, for example, Exif metadata embedded within image files, other metadata from other user devices, image context information, and image use information created by the image analysis engine 230 (or retrieved by or provided to the image analysis engine 230). In other words, the images may be analyzed to determine the image quality or composition of the image. In some embodiments, the image analysis engine 230 may index the at least one image files based on any of the following types of information: the camera metadata, the other metadata, the image context, and the purpose of the pictures.

For example embodiments, the metadata may be defined by the Exif standard, which covers a broad spectrum of metadata tags: date and time information (digital cameras will record the current date and time and save this in the metadata); camera settings (this includes static information such as the camera model and make, and information that varies with each image such as orientation (rotation)); aperture; shutter speed; focal length; metering mode; and ISO speed information. The metadata may be used to help find images; a thumbnail for previewing the picture on the camera's LCD screen, in file managers, or in photo manipulation software; descriptions; and copyright information. In various embodiments, Exif inserts some of the camera metadata (including the thumbnail image) into JPEG in conformity to the JPEG specification. Users may then view Exif format image files using JPEG compliant Internet browsers, picture viewers, photo retouch software, and so forth as JPEG image files. The Exif data may be embedded within the image file itself, and may also be parsed or extracted from the image files. For example, software libraries (such as libexif for C and Adobe XMP toolkit or Exiv2 for C++, Metadata Extractor for Java, or Image ExifTool for Perl) may parse Exif data from image files and read/write Exif tag values.

For example embodiments, the feedback may be related to improving various aspects of future picture-taking based on one or more image files corresponding to pictures already taken. For some embodiments, the feedback may be related to controlling the light (when shooting in natural light) based on the location or time of day. In other examples, the feedback may be related to camera settings (e.g., camera exposure settings such as aperture size, ISO, shutter speed and white balance). In yet further examples, the feedback may be based on an analysis of a single image file or a group of image files. In other examples, the feedback may be provided to a user immediately or while the user is still taking pictures such that the user may improve the image quality of the pictures the user is taking during a specific session, location, or event. In additional examples, the feedback may provide product recommendations to upgrade a camera or accessories (e.g., lens, filters, and so forth). The user feedback (including recommendations) may be displayed on a viewing device, which may include the image capture device 112 or a client device in communication with the networked system 102.

In various embodiments, the feedback may be generated using one or a combination of information types, such as camera metadata, other metadata (e.g., from other devices or added by a user), context information (e.g., related to the environment or scene conditions), or a user's purpose for taking the pictures (e.g., specific event such as birthday party, wedding, vacation, sporting event).

In an example, the image analysis engine 230 determines a picture was taken with flash, while pointing the camera west at night, and using a standard lens. This information may be derived from the camera metadata and context information. Furthermore, the image analysis engine 230 determines, based on GPS information (also referred to as "other metadata" from a user device), that the weather condition at the time the picture was taken was clear and not cloudy. The image analysis engine 230 may also determine that the composition of the picture includes an airplane that is far away based on the lens metadata and the size of the plane in the picture. The image analysis engine 230 may determine, based on use information (provided by user input, or other information derived or retrieved from any number of sources), that the user is on vacation in Paris. In various embodiments, the image analysis engine 230 may receive information from various sources, and may also derive information based on the information received. For example, based on the camera metadata, the image analysis engine 230 determines where the picture was taken and what was taken, and based on other metadata (e.g., GPS data), can extract other information such as night in Paris, morning in San Francisco, picture taken from the east, stormy weather, time of day, and so forth.

When generating the feedback, the image analysis engine 230 may take various factors into consideration such as: (1) the image capture device (e.g., image capture device 112) used to take the picture has a suitable zoom lens for this type of picture, but the user did not optimally or properly zoom the lens; (2) the image capture device used did not include a zoom lens; and (3) the picture was a bad picture from the standpoint that the user did not use camera settings appropriate for current conditions when the picture was taken.

Another factor that the image analysis engine 230 may consider is the purpose of taking the picture (also referred to as "use information"). For example, if the purpose of taking the picture is to sell products on an e-commerce site, then the image analysis engine 230 may provide feedback that the picture is either too light or too dark for a potential buyer to properly see and evaluate the product offered for sale. For example, the image analysis engine 230 may provide feedback to the user related to improvements to the image quality of future pictures taken. For instance, the feedback to the user may recommend the user to: (1) use the zoom lens on the user's camera; (2) turn up the flash because the user is facing east; (3) adjust one or more of the camera settings; (4) use a more powerful flash; and (5) use a better soft flash and so forth.

In a further example, a navigation engine 220 allows users to navigate through various categories, catalogs, or inventory data structures according to which listings may be classified within the networked system 102. For example, the navigation engine 220 allows a user to successively navigate down a category tree comprising a hierarchy of categories (e.g., the category tree structure) until a particular set of listings is reached. Various other navigation applications within the navigation engine 220 may be provided to supplement the searching and browsing applications. For example, the navigation engine 220 may allow the user to browse the various camera products and accessories, as well as other products or services, recommended by the image analysis engine 230. The navigation engine 220 may also be used to browse the image files or other media files. The navigation engine 220 may record the various user actions (e.g., clicks) performed by the user in order to navigate down the category tree.

Figure 2B:
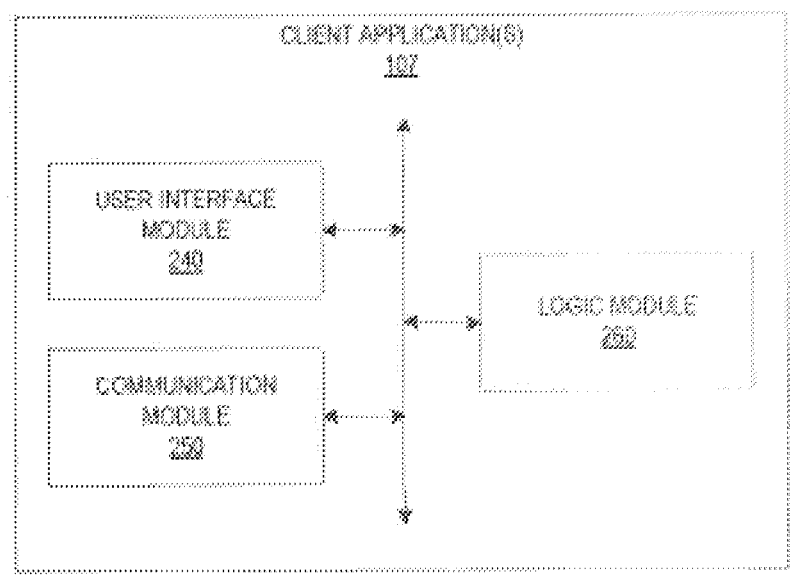
FIG. 2B is a block diagram illustrating an example embodiment of a client application, according to example embodiments.

FIG. 2B is a block diagram of the client application(s) 107, which may provide a number of functions operable to present feedback, including recommended items, to the user. In an example embodiment, the client application(s) 107 may include a user interface module 240, a communication module 250, and a logic module 260. All, or a portion, of the modules 240-260 may communicate with each other, for example, via a network coupling, shared memory, and the like. It will be appreciated that each module may be implemented as a single module, combined into other modules, or further subdivided into multiple modules. Other modules not pertinent to example embodiments may also be included, but are not shown.

The user interface module 240 may provide various user interface functionality operable to interactively present and receive information from a user, such as user 105. For example, the user interface module 240 may present recommended item listings to the user, as well as other feedback to the user. The recommended items presented may be based on feedback generated related to improving various aspects of pictures based on one or more image files of the pictures or other media files. Information may be presented using a variety of means including visually displaying information and using other device outputs (e.g., audio, tactile, and so forth). Similarly, information may be received by a variety of means including alphanumeric input or other device input (e.g., one or more touch screen, camera, tactile sensors, light sensors, infrared sensors, biometric sensors, microphone, gyroscope, accelerometer, and other sensors). It will be appreciated that the user interface module 240 may provide many other user interfaces to facilitate functionality described herein. Presenting is intended to include communicating information to another device with functionality operable to perform presentation using the communicated information.

The communication module 250 may provide various communications functionality for a client device 110. For example, network communication such as communicating with networked system 102, the database servers 124, the third party servers 130, and the image capture device 112 may be provided. In various example embodiments, network communication may operate over any wired or wireless means to provide communication functionality. Web services are intended to include retrieving information from the third party servers 130 and the application servers 118. Information retrieved by the communication module 250 comprise data associated with the user 105 (e.g., user profile information from an online account, social networking data associated with the user 105), data associated with an item (e.g., images of the item, reviews of the item), and other data.

The logic module 260 may provide various logic functions to facilitate operations of the client application(s) 107. For example, logic to analyze user inputs received by the user interface module 240 and logic to determine actions based on the user inputs may be provided by the logic module 260. The logic module 260 may perform a wide variety of application logic. For example embodiments, the logic module 260 may access, generate, or provide metadata from the client device 110 to the image analysis engine 230.

Figure 3:
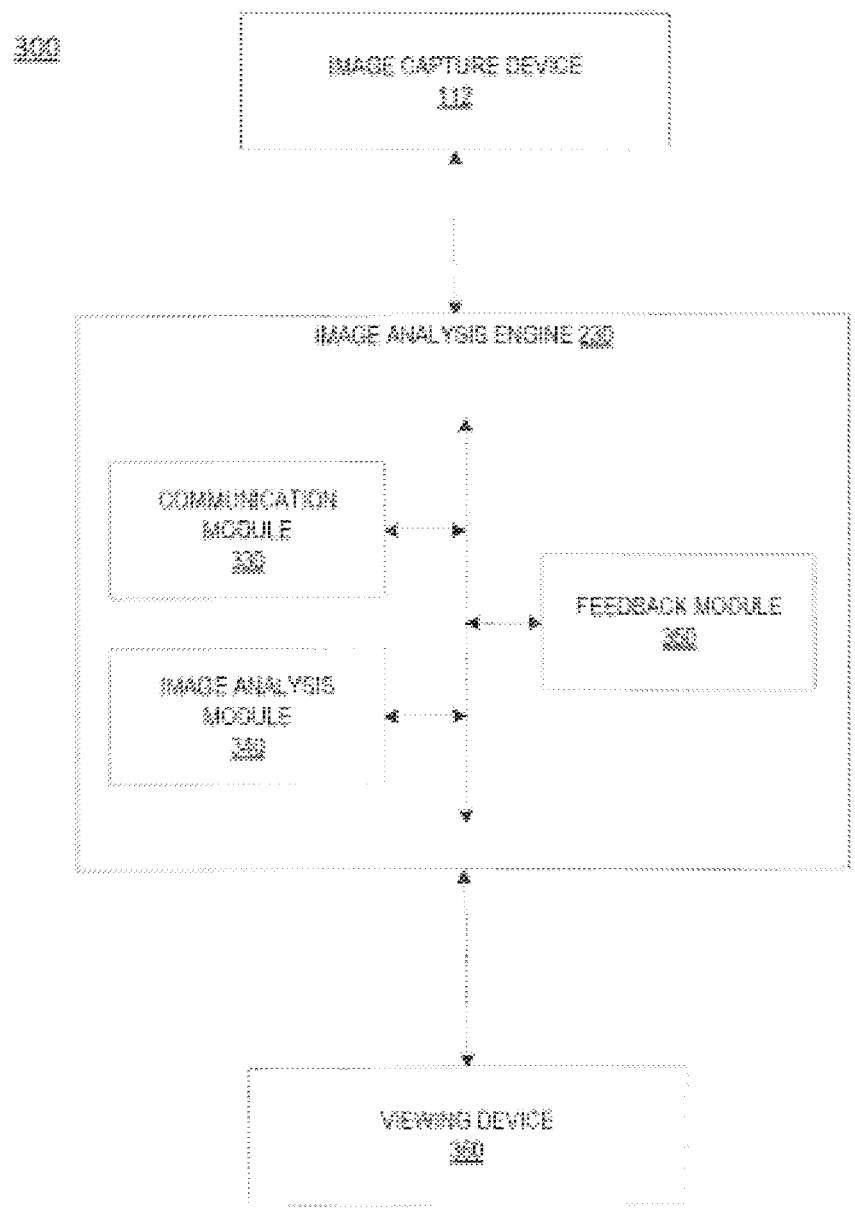
FIG. 3 is a block diagram illustrating an image feedback system, according to example embodiments.

FIG. 3 illustrates an image feedback system 300 based on capturing and analyzing one or more image files in accordance with various embodiments. The image feedback system 300 includes an image capture device 112, an image analysis engine 230, and a viewing device 360. The viewing device 360 may represent the client device 110 or may represent viewing from the image capture device 112. All of the modules may communicate with each other, for example, via a network coupling, shared memory, and the like. It will be appreciated that each module may be implemented as a single module, combined into other modules, or further subdivided into multiple modules. Other modules not pertinent to example embodiments may also be included, but are not shown.

Figure 4A:
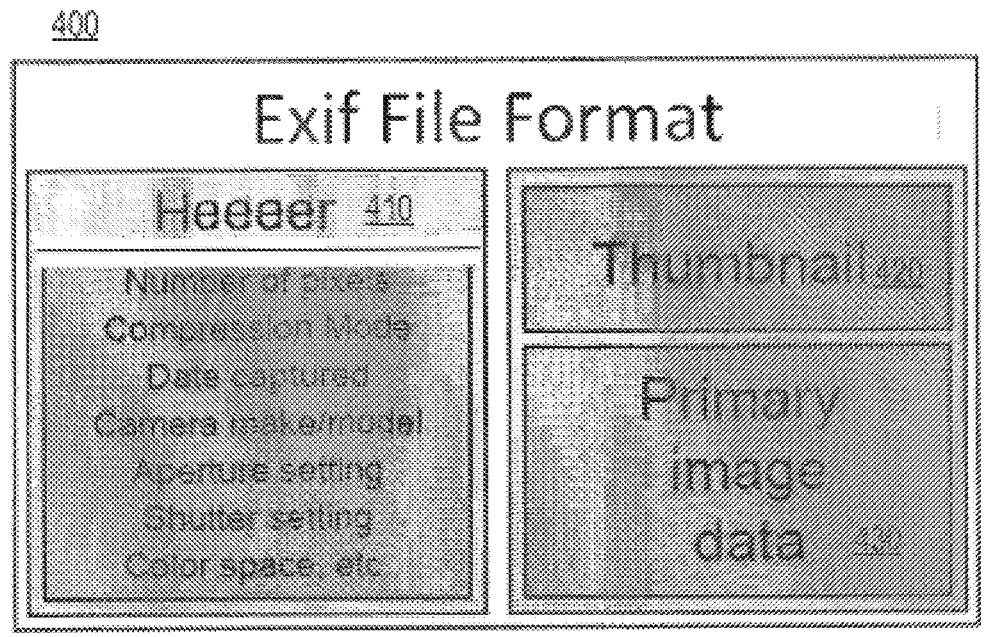
FIG. 4A is a block diagram illustrating an Exif file data configuration, according to example embodiments.
Figure 5:
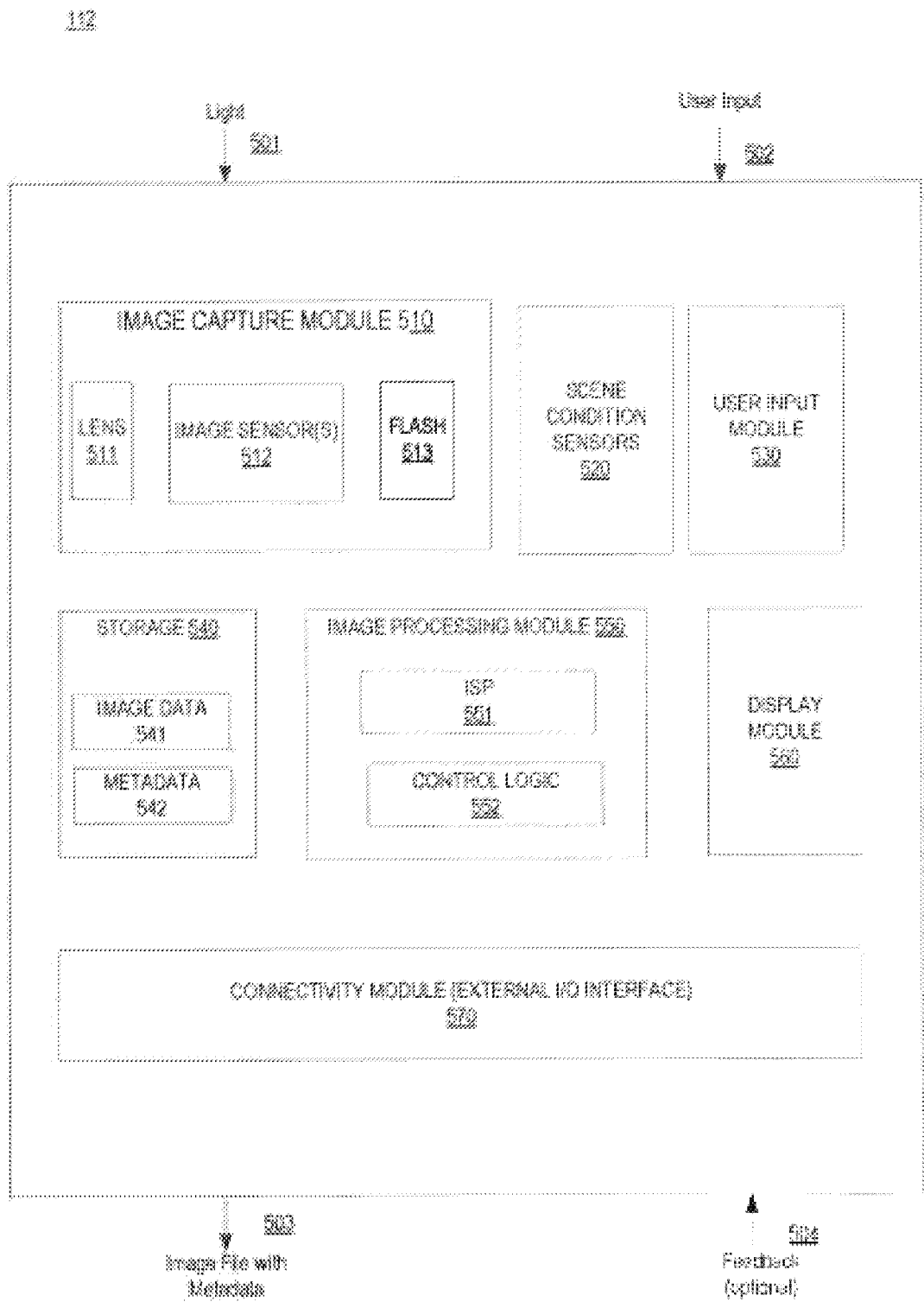
FIG. 5 is a block diagram illustrating an image capture device, according to example embodiments.

For some embodiments, the image capture device 112 may be a camera (such as digital camera), which uses the Exif file format, as shown in FIG. 4A. In an alternative embodiment, the image capture device 112 may be integrated in a mobile device (e.g., mobile device 900 shown in FIG. 9) or a computing device (e.g., computing device shown in FIG. 10). In other embodiments, the image capture device 112 may include other types of devices which may capture images or other forms of media (e.g., scanning devices, video, and audio recording devices). Additional file formats, other than Exif file format, may be used to embed or provide camera metadata associated with image files or other media files. Although many of the described embodiments use the term "image file," other embodiments may use other types of media files. An example of an image capture device 112 is shown in FIG. 5, and will be described below.

The image analysis engine 230 includes a communication module 330, an image analysis module 340, and a feedback module 350, according to an example embodiment. The communication module 330 may provide various communications functionality for the image analysis engine 230. For example, network communication, such as communicating with the image capture device 112, the client devices 110, and the third party servers 130, may be provided. In various example embodiments, network communication may operate over any wired or wireless means to provide communication functionality. Web services are intended to include retrieving information from the third party servers 130 and the application servers 118. Information retrieved by the communication module 330 may comprise data associated with the user 105 (e.g., user profile information from an online account, social networking data associated with the user 105), data associated with an item (e.g., images of the item, reviews of the item), data associated with analyzing an image file (e.g., camera metadata, other metadata from other user devices, image context information, image use information, and other user provided data), and other data.

For example embodiments, the image analysis engine 230 receives image files, including the camera metadata, from the image capture device 112. In some embodiments, the image capture device 112 may also operate as the viewing device 360 such that feedback generated by the image analysis engine 230 is provided to the image capture device 112. In other embodiments, the image analysis engine 230 provides feedback to the viewing device 360. An example of the viewing device 360 is the client device 110 (shown in FIG. 1), which may be a user's mobile device or a user's computing device (e.g., desktop, laptop, and so forth). The feedback viewed via the viewing device 360 may be related to improving various aspects of taking future pictures (or videos) based on analyzing one or more image files of the pictures (or other media files). For some embodiments, the feedback may be related to controlling the light (when shooting in natural light) based on the location or time of day. In other examples, the feedback may be related to camera settings (e.g., camera exposure settings such as aperture size, ISO, shutter speed and white balance). In yet further examples, the feedback may be based on an analysis of a single image file or a group of image files. In other examples, the feedback may be provided to a user immediately or while the user is still taking pictures such that the user may improve the image quality of the pictures the user is taking during a specific session, location, or event. In additional examples, the feedback may provide product recommendations to upgrade a camera or accessories (e.g., lens, filters). The user feedback (including recommendations) may be displayed on the viewing device 360, which may include the image capture device 112 or a client device (e.g., client device 110) in communication with the networked system 102.

The feedback may be provided in real-time or at a later time (e.g., when viewing pictures using a software enhancement viewer). The feedback may be based on an individual picture taken or a collection of pictures taken. Various examples are provided below:

Example 1: The feedback may include a recommendation to upgrade or purchase a Nikon Coolpix 700 camera to a newer model. The feedback to the user may include pricing information such as "you can upgrade your camera for $300."

Example 2: The feedback may provide real-time or near real-time feedback to a user who is taking pictures of his kids at the beach. The feedback may recommend that the user adjust camera settings related to f-stop when taking additional pictures at the beach.

Example 3: The feedback on pictures taken at a ski trip may indicate to the user that the ski trip pictures are all shaky.

Example 4: The feedback on in-motion pictures taken at a sports game may recommend upgrading to a high speed camera.

Example 5: The feedback to a PayPal user who takes pictures of credit cards, checks for deposit, driver's license, holograms, reflective silver paint, and other items used in mobile payments systems, may indicate that the number 7 looks like a number 3.

Example 6: The feedback may be unique to specific camera. For example, pictures taken with Canon cameras have a yellowish tinge. By providing various types of feedback, a user may adjust how he or she takes pictures in the future.

Example 7: The feedback may be based on pictures taken at a stadium at a baseball game. The image analysis engine 230 may determine that the user takes a lot of sports pictures, and may provide feedback to recommend purchasing an additional filter.

Example 8: The image analysis engine 230 may determine that a user takes a lot of pictures in the morning, and may provide feedback to recommend purchasing a UV filter.

Example 9: The image analysis engine 230 may determine that a user takes pictures while in motion (e.g., cycling) based on other metadata (e.g., a wearable device or mobile phone), and may recommend suitable cameras that have reduced motion blur.

In some embodiments, the viewing device 360 may be used to view feedback, such as product recommendations, and then proceed to browse or purchase the products recommended.

Figure 6:
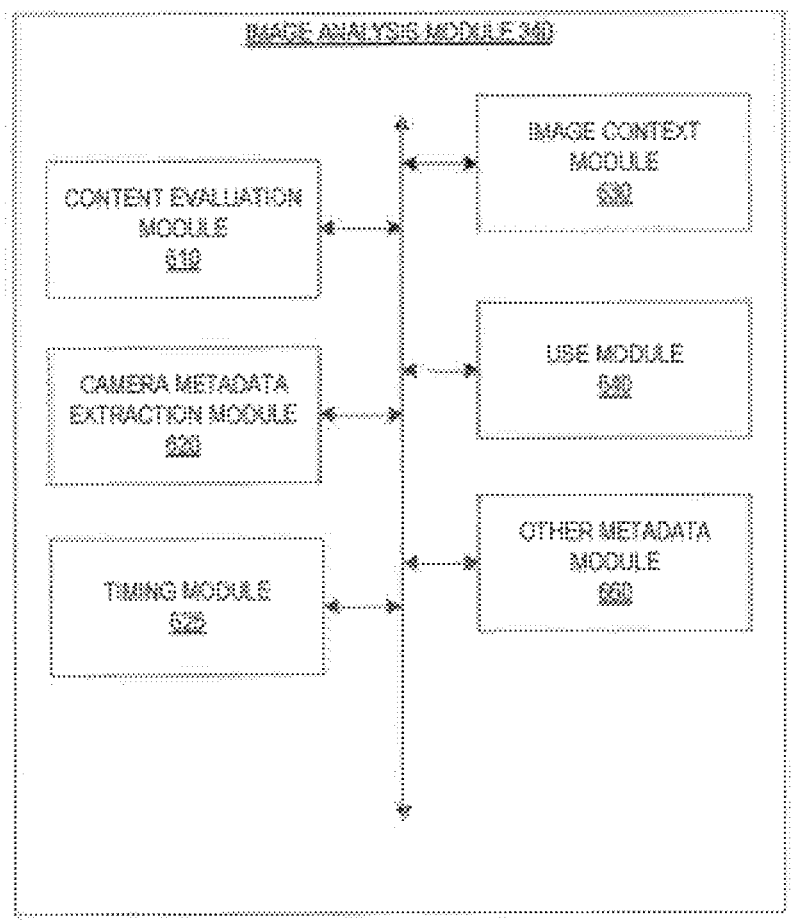
FIG. 6 is a block diagram illustrating an image analysis module, according to example embodiments.

In example embodiments, the image analysis module 340 analyzes the image files using various data, for example, camera metadata, other metadata from other user devices, image context information, image purpose information, other user provided data, and so forth. An example embodiment of the image analysis module 340 is shown in FIG. 6. Once the data from various sources is analyzed, the feedback module 350 generates feedback, which is then communicated via the communication module 330 to the viewing device 360, in some embodiments, or the image capture device 112, in other embodiments.

FIG. 4A illustrates an example of an Exif file format for image files. The Exif (Exchangeable Image File Format) stores technical metadata about capture, image characteristics, and more. Many digital cameras have the capabilities to embed camera metadata, called Exif data, into image files (primarily in JPEG and TIFF formats) they create. The primary feature of Exif is to record camera information in an image file at the point of capture. The Exif is a standard established by JCIA (Japan Camera Industry Association) and is currently managed by JEITA (Japan Electronics and Information Technology Industries Association) and promoted by CIPA (Japan Camera Industry Association).

The Exif file data configuration 400 includes a header 410, a thumbnail 420, and primary image data 430. The camera metadata may be referred to as Exif data, in example embodiments, using the Exif file data configuration 400. The header 410 stores camera metadata (also referred to as "technical metadata"), which may be embedded in an image file at the point of capturing the image. The camera metadata records camera information in image files. In one example, the header 410 includes one or more of the following data fields for storing the camera metadata: the camera make and model, its serial number, the date and time of an image capture, the shutter speed, the aperture, the lens used, the ISO speed settings, white balance, distance to the subject, and other technical details. The Exif file data format 400 may also include the thumbnail 420 along with technical and primary image data (represented by header 410 and primary image data 430, respectively) stored in a single image file.

The Exif is a standard that specifies the formats for images, sound, and ancillary tags used by many digital cameras (including smartphones), scanners, and other systems handling image and sound files recorded by digital cameras. The specification uses existing file formats with the addition of specific metadata tags. The standard comprises an Exif image file specification and an Exif audio file specification.

The Exif format has standard tags for location information. Many cameras and mobile phones have a built-in GPS receiver that stores the location information in the Exif header 410 when a picture is taken. Some other cameras have a separate GPS receiver that fits into the flash connector or hot shoe. Recorded GPS data can also be added to any digital photograph on a computer, either by correlating the time stamps of the photographs with a GPS record from a hand-held GPS receiver or manually by using a map or mapping software. The process of adding geographic information to a photograph is referred to as "geo-tagging." The Exif tag contains metadata about the picture such that if a picture is taken with a GPS-enabled camera, the exact location and time it was taken, the unique ID number of the device, is known (usually by default).

FIG. 4B illustrates an example of Exif data for a picture made with a typical digital camera. A table 450 represents camera metadata from picture taken with a Casio QV-4000 camera. The table 450 includes tags 451 associated values 452. Most of these fields are provided in the camera's output. Some fields, such as notice of authorship and copyright information, may be filled in (by a user) during later stages of processing. In various other embodiments, other tags 451 may be included, or some of the tags 451 omitted.

The Exif specification also describes the RIFF file format used for WAV audio files, and defines a number of tags for storing metadata such as artist, copyright, creation, and more in these files. FIG. 4C illustrates an example of Exif data found in a WAV file. A table 460 represents camera metadata recorded from a Pentax Optio WP digital camera. The table 460 includes tags 461 and associated values 462. In various other embodiments, other tags 461 may be included, or some of the tags 461 omitted.

FIG. 5 illustrates an example embodiment of an image capture device 112. The image capture device 112 may be configured to acquire both still images and moving images (e.g., video) in example embodiments. The image capture device 112 includes an image capture module 510, scene condition sensors 520, user input module 530, storage 540, image processing module 550, display module 560, and connectivity module 570. The image capture device 112 may represent a digital camera in example embodiments. The image capture device 112 may be integrated in a mobile device (e.g., mobile device 900 shown in FIG. 9 or other computing device shown in FIG. 10) in other example embodiments. All of the modules may communicate with each other, for example, via a network coupling, shared memory, and the like. It will be appreciated that each module may be implemented as a single module, combined into other modules, or further subdivided into multiple modules. Other modules not pertinent to example embodiments may also be included, but are not shown.

The image capture module 510 may include a lens 511, one or more image sensors 512, and a flash 513 to capture and convert light 501 into electrical signals. User input 502 is received by the image capture device 112 via user input module 530. The user input 502 may be received by pressing a shutter button all the way down to take a picture. By way of example, the image sensor(s) 512 may include a complementary metal oxide silicon (CMOS) image sensor or a charged-coupled device (CCD) sensor. Generally, the image sensor(s) 512 includes an integrated circuit having an array of pixels, with each pixel including a photo-detector for sensing light. The image sensor(s) 512 may include a color filter array (CFA), not shown in FIG. 5, which may overlay the pixel array of the image sensor(s) 512 to capture color information. Together, the photo-detectors and the color filter array may provide both wavelength and intensity information with regard to light captured through the image capture device 112, which may be representative of a captured image.

The storage 540 may include one or more types of data storage media, depending upon the particular type of image capture device 112. For example, the storage 540 may include fixed volatile and non-volatile memory such as random access memory, removable non-volatile storage such as a flash memory, or mass storage, such as an optical or magnetic disk drive. The storage 540 may also contain several program modules that implement the various camera functions. The storage 540 may store image data 541, including raw image data from the image capture module 510 and processed image data from the image processing module 550. The storage 540 may also include metadata 542, including camera metadata and thumbnails. The storage 540 may also include image statistical data (not shown), which may represent data detected by the scene condition sensors 520. The storage 540 may also include other data received from the user input 502 and feedback 504.

The image processing module 550 may perform various image processing steps, such as defective pixel detection/correction, lens sharing correction, demosaicing, image sharpening, noise reduction, gamma correction, image enhancement, color-space conversion, image compression, image scaling operations, and so forth. The image processing module 550 may include an image signal processor (ISP) 551 that may receive raw image data from the image capture module 510. The ISP 551 may perform one or more image processing operations on the raw image data, as well as collect statistics about the image data. The ISP 551 may receive pixel data from the storage 540, which stores the image data 541 and metadata 542. In various embodiments, the Exif file data configuration 400 may be used. One of the main roles of the ISP 551 is to perform demosaicing to interpolate the RGB for each pixel. Other roles of the ISP 551 include autofocus, auto-exposure, and auto-white balance. The ISP 551 also corrects for lens imperfections such as lens shading, geometry/distortion, and vignetting. The ISP 551 may also help with noise reduction, filtering, HDR, cleaning-up, and JPEG and is the controller for the CMOS/focus assembly.

The statics collected by the ISP 551 may be provided to a control logic 552. The control logic 552 may include a processor or microcontroller configured to execute one or more routines (e.g., firmware) that may be configured to determine a number of control parameters for the image capture device 112 based on the statistical data. The statistical data may include, for example, image sensor statistics relating to auto-exposure, auto-white balance, auto-focus, flicker detection, black level compensation (BLC), lens shading correction, and so forth. Examples of control parameters include sensor control parameters (e.g., gains, integration time for exposure control, camera flash control parameters), lens control parameters (e.g., focal length for focusing or zoom), or a combination of such parameters. Other control parameters may include gain levels and color correction matrix (CCM) coefficients for auto-white balance and color adjustments, lens shading correction parameters, and so forth.

The processed image data may be provided to the display module 560 for viewing by a user or may be further processed by a graphics engine or GPU. Additionally, the processed data may be stored in the storage 540 and accessed by the display module 560. In some embodiments, the output of the ISP 551 may be provided to a compression engine for the image data (e.g., JPEG compression engine for encoding still images or H.264 for encoding video images, not shown), either directly from the ISP 551 or accessed from the storage 540. In further embodiments, a corresponding decompression engine for the image data may be used (not shown).

The user input module 530 may include various inputs, for example, a shutter buttons (to take a picture), control buttons (to adjust various camera settings), shooting mode dial (to change among different scene modes, adjust exposure choices, and so forth), microphone (to capture audio for movie clips and voice annotations), an optical viewfinder (to frame and compose a picture), zoom lens control (to magnify or reduce the size of an image), power switch (to turn the camera on or off), display control/menu buttons, picture review button, cursor pad, and so forth. The user input 502 is received by the user input module 530 and converted into signals, which may be used as input into the image processing module 550.

The connectivity module 570 may be an external I/O interface in an example embodiment. In various embodiments, the images captured or processed by the image processing module 550 (e.g., the image file with metadata 503) may be transmitted to the networked system 102, the client device 110 (e.g., a mobile device or any other computing device) via the connectivity module 570. In some embodiments, the feedback 504 may be received from the image analysis engine 230.

The image capture device 112 may also include one or more scene condition sensors 520. The scene condition sensors 520 may be used to detect certain conditions or objects in a scene, and may be solid state or integrated circuit devices that have circuitry or structure that is able to sense various conditions during the image capture process. Objects in a scene may be detected by one or more sensors. One example of the scene condition sensor 520 includes an ambient light sensor detector (ALS), which may provide a measure of the level of visible light intensity in the environment surrounding the image capture device 112, also referred to as the ambient light level. Another example of the scene condition sensor 520 includes an auto focus sensor to help determine a measure of the distance to or location of an object. The auto focus sensor may include an infrared transmitter and receiver.

Based on the information about the scene obtained by one or more of the scene condition sensors 520, and analyzing images captured by the image capture module 510 and processed by the image processing module 550, image information may be provided to the image context module 630, shown in FIG. 6, to generate image context information related to the environment or scene condition. Image context information may also be generated without scene information obtained by one or more scene conditions sensors 520, and based on only on analyzing images captured by the image capture module 510 and processed by the image processing module 550 in other embodiments. In further embodiments, image use information related to the purpose of taking the pictures may also be based on analyzing images captured by the image capture module 510 and processed by the image processing module 550. The image file with metadata 503 generally represents images captured by the image capture module 510 and processed by the image processing module 550.

FIG. 6 illustrates a block diagram of an example embodiment of the image analysis module 340. The image analysis module 340 includes one or more of the following modules: content evaluation module 610, camera metadata extraction module 620, timing module 625, image context module 630, use module 640, and other metadata module 650.

The image analysis module 340 may be included in the image analysis engine 230, and is used to analyze pictures based on image data, including camera metadata. The image analysis is then provided to the feedback module 350, as shown in FIG. 3, to generate feedback to a user. The feedback to the user may be related to image quality, recommendations for improving the image capture process, recommendations for camera upgrades and accessories that may improve image quality, and so forth. The image data, including the camera metadata, may be provided by the image capture device 112.

The feedback to a user may also be based on image data, including camera metadata, along with other information. The other information may include image context information related to the environment or scene condition of one or more images, which may be generated or provided by the image context module 630. The other information may include image use information related to the purpose of taking the pictures, which may be generated or provided by the use module 640.

The image context information and the use information may be generated based on inputs received from the image capture device 112. For example, the image processing module 550 within the image capture device 112 may perform image analysis, and this image analysis data may be included in the image file or sent to the image analysis engine 230 (including the image analysis module 340) separately.

The other information may include other metadata, which represents metadata available from other devices, such as a user's mobile device and provided to the other metadata module 650. The image data, including the camera metadata, alone or in combination with the one or more types of other information, may be evaluated or indexed in an intelligent manner by the content evaluation module 610. The image analysis performed by the image analysis module 340 is generally provided to the feedback module 350 to generate feedback to a user based on the various information types described above.

The timing module 625 may be used in certain situations to send immediate feedback to a user or to send delayed feedback to a user. In certain embodiments, the timing module 625 may use the other information, such as the use information related to the purpose of capturing images or taking pictures. For example, if the image capture device 112 represents the viewing device 360 for receiving the feedback, then the timing module 625 may make a determination to provide real-time, or near real-time, feedback to the image capture device 112 while a user of the image capture device 112 is still taking pictures (e.g., at a specific event like a soccer game), and can incorporate the feedback to improve the pictures at that specific event. In other situations, the timing module 625 may make a determination that the user's purpose of taking the pictures is to create a digital photo album of a recent vacation, and delayed feedback may be appropriate. The timing module 625 may also consider whether the image analysis is based on a single picture or a small number of pictures versus the image analysis of a large number of pictures (e.g., such as those included in a digital photo album).

Figure 7:
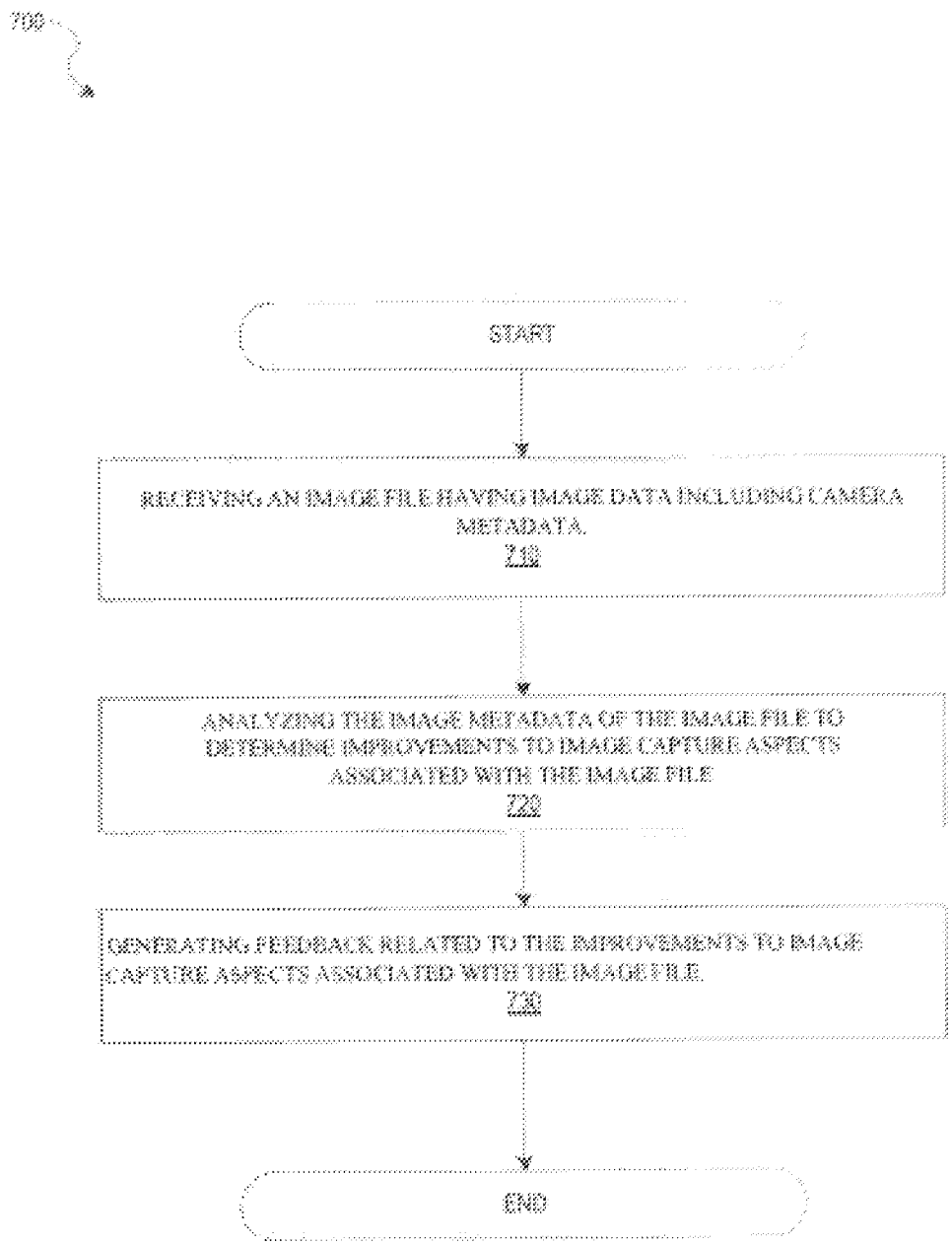
FIGS. 7 and 8 are flow diagrams illustrating example methods for generating feedback related to improvements to the image capture aspects associated with an image file, according to example embodiments.

FIG. 7 is a flow diagram illustrating a method 700 for generating feedback related to improvements to the image capture aspects associated with an image file, according to an example embodiment. In one embodiment, the method comprises: at operation 710, receiving an image file, the image file having image data including camera metadata; at operation 720, analyzing the camera metadata of the image file to determine improvements to image capture aspects associated with the image file; and at operation 730, generating feedback related to the improvements to the image capture aspects associated with the image file. In an example embodiment, the flow diagram of method 700 may be implemented using one or more modules of the image analysis engine 230 (shown in FIG. 3). For example, the operation 710 may be performed by the communication module 330, the operation 720 may be performed by the image analysis module 340, and the operation 730 may be performed by the feedback module 350. In further embodiments, the operation 720 may be performed by one or more modules within the image analysis module 340. For example, content evaluation module 610, image context module 630, use module 640 or other metadata module 650 may be used to perform the operation 720. In alternative embodiments, additional operations may be added to the method 700 or one or more operations may be deleted from the method 700. In further embodiments, the operation of methods 700 and 800, or variants of these flow diagrams, may be combined.

Figure 8:
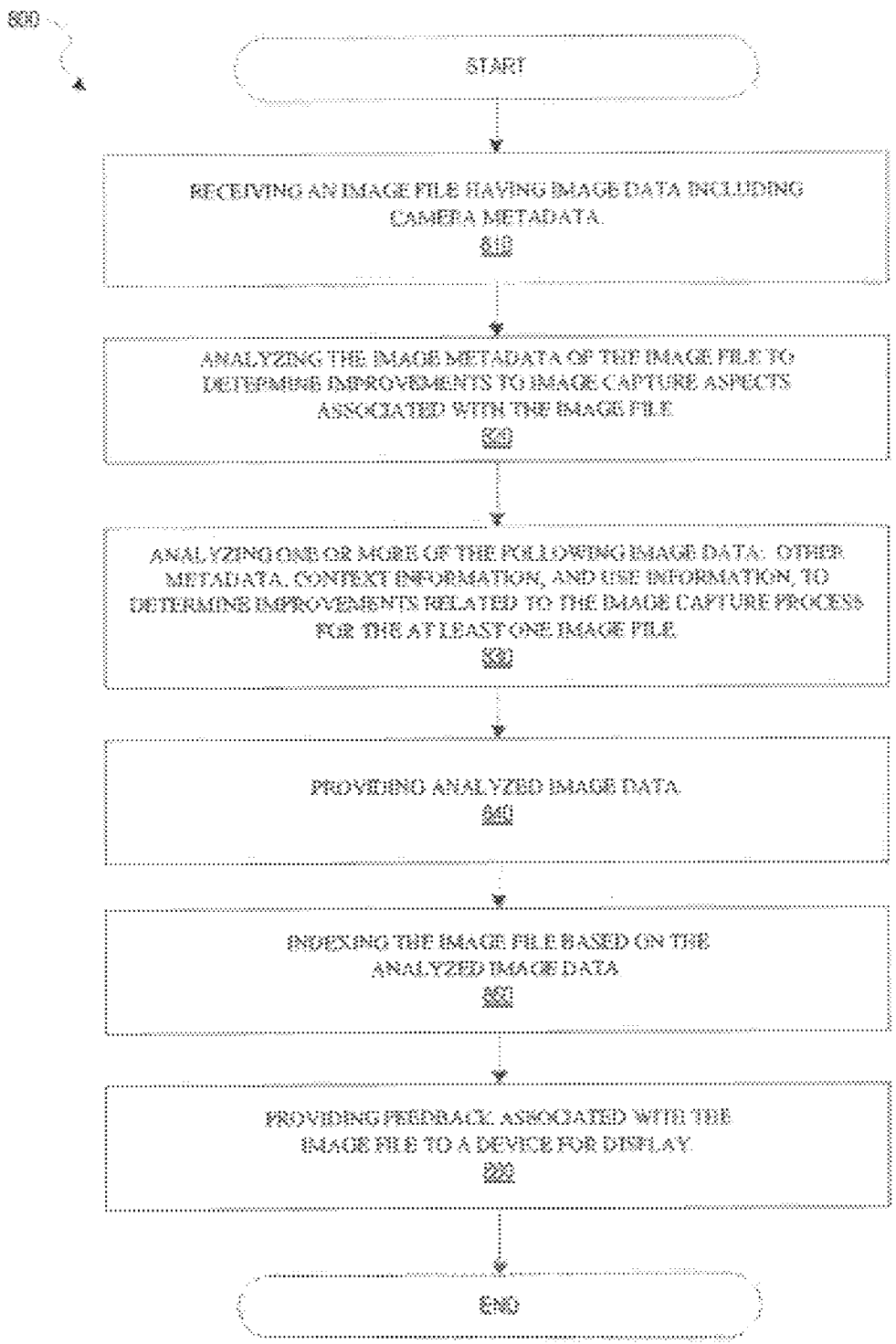

FIG. 8 is a flow diagram illustrating a method 800 for generating feedback related to improvements to the image capture aspects associated with at least one image file, according to another example embodiment. In one embodiment, the method 800 comprises: at operation 810, receiving an image file having image data including camera metadata; at operation 820, analyzing the camera metadata of the image file to determine improvements to image capture aspects associated with the image file; at operation 830, analyzing one or more of the following image data: other metadata for the at least one image file, context information for the at least one image file, and use information for the at least one image file, to determine improvements related to the image capture process for the at least one image file; at operation 840 providing analyzed image data; at operation 850, indexing the image file based on the analyzed image data; and at operation 860, providing feedback associated with the image file to a device for display. In an example embodiment, the flow diagram of method 800 may be implemented using one or more modules of the image analysis engine 230 including one or more modules of the image analysis module 340, or one or more modules of the feedback system 300. For example, the operation 810 may be performed by the communication module 330, the operations 820, 830, 840, and 850 may be performed by the image analysis module 340, and the operation 860 may be performed by the feedback module 350. In other examples, the operation 820 may be performed by the content evaluation module 610 and the camera metadata extraction module 620; the operation 830 may be performed by the image context module 630, the use module 640 and the other metadata module 650; the operation 850 may be performed by the context evaluation module 610; and operation 860 may be performed by the timing module 625. In alternative embodiments, additional operations may be added to the method 800 or one or more operations may be deleted from the method 800. In further embodiments, the operation of methods 700 and 800, or variants of these flow diagrams, may be combined.

In further embodiments, a method for generating feedback related to improvements to the image capture aspects associated with at least one image file may include extracting the camera metadata for the at least one image file; receiving other metadata associated with another device for the at least one image file; and analyzing, using at least one processor of the machine, the other metadata to determine improvements related to the image capture process for the at least one image file.

In another embodiment, a method for generating feedback related to improvements to the image capture aspects associated with at least one image file may include generating image context information related to scene conditions for the at least one image file. In other embodiments, a method for generating feedback related to improvements to the image capture aspects associated with at least one image file may include generating use information related to a user's purpose for taking pictures for the at least one image file. In further embodiments, generating feedback may include feedback to recommend at least one of a camera and camera accessory for purchase. In yet further embodiments, generating feedback may include generating feedback to recommend adjusting at least one camera setting. In alternative embodiments, generating feedback may include generating feedback related to one or more of the following: feedback associated with improving the image quality; feedback associated with image capture device recommendations; and feedback associated with taking pictures using the image capture device features and settings.

In other embodiments, generating feedback may be based on analyzing one image file or generating feedback based on analyzing a group of image files from the at least one image file. In some other embodiments, immediate feedback associated with the at least one image file after the at least one image file is generated by an image capture device may be provided.

Figure 9:
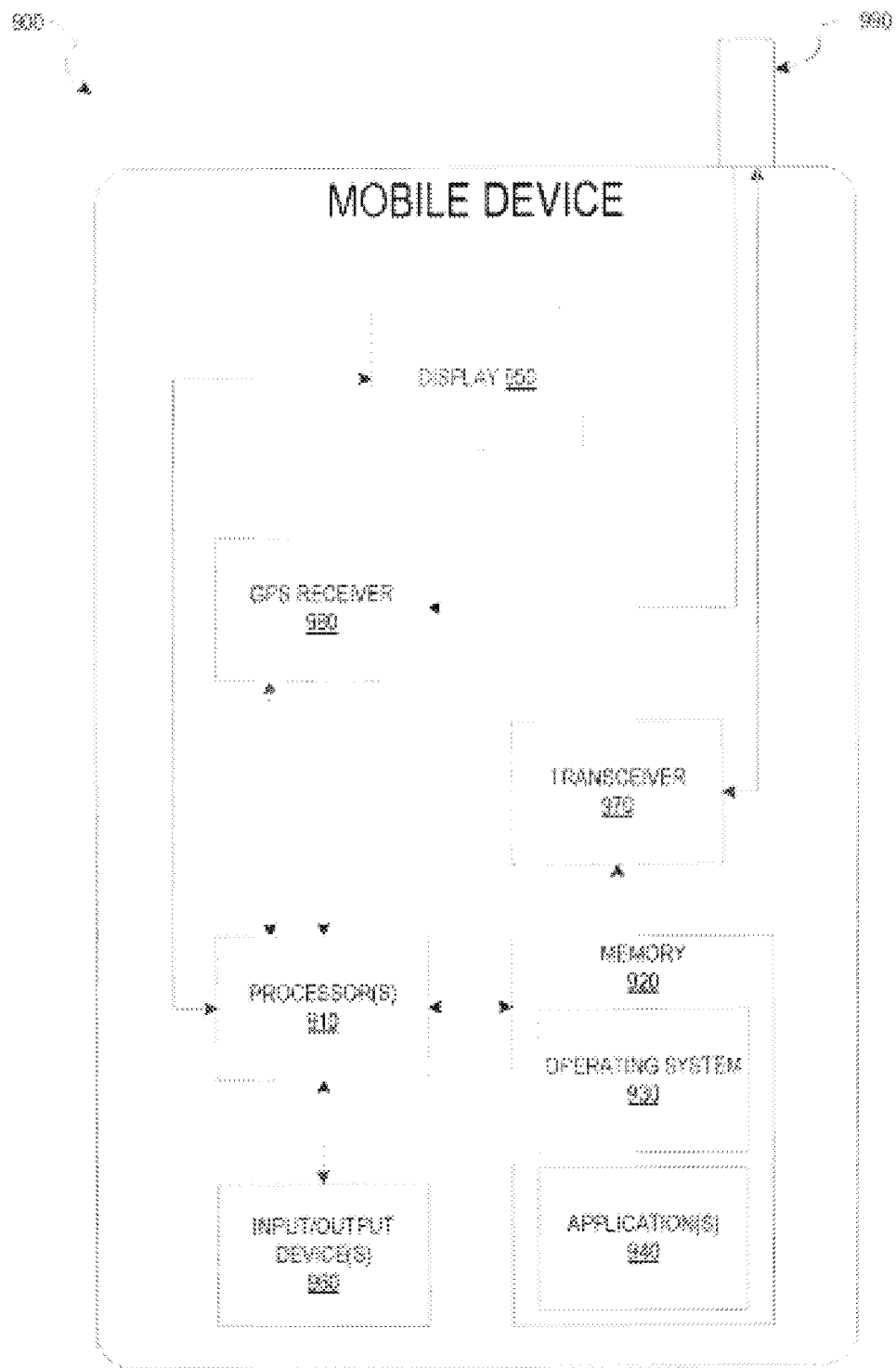
FIG. 9 is a block diagram illustrating a mobile device, according to example embodiments.

FIG. 9 is a block diagram illustrating a mobile device 900, according to an example embodiment. The mobile device 900 may include a processor 910. The processor 910 may be any of a variety of different types of commercially available processors suitable for mobile devices (e.g., an XScale architecture microprocessor, a Microprocessor without Interlocked Pipeline Stages (MIPS) architecture processor, or another type of processor). A memory 920, such as a random access memory (RAM), a Flash memory, or other type of memory, is typically accessible to the processor 910. The memory 920 may be adapted to store an operating system (OS) 930, as well as application programs 940, such as a mobile location enabled application that may provide location based services (LBSs) to a user.

The processor 910 may be coupled, either directly or via appropriate intermediary hardware, to a display 950 and to one or more input/output (I/O) devices 960, such as a keypad, a touch panel sensor, a microphone, and the like. Similarly, in some embodiments, the processor 910 may be coupled to a transceiver 970 that interfaces with an antenna 990. The transceiver 970 may be configured to both transmit and receive cellular network signals, wireless data signals, or other types of signals via the antenna 990, depending on the nature of the mobile device 900. In this manner, a connection with a network such as the network 104 of FIG. 1 may be established. Further, in some configurations, a GPS receiver 980 may also make use of the antenna 990 to receive GPS signals

MODULES, COMPONENTS, AND LOGIC

Figure 10:
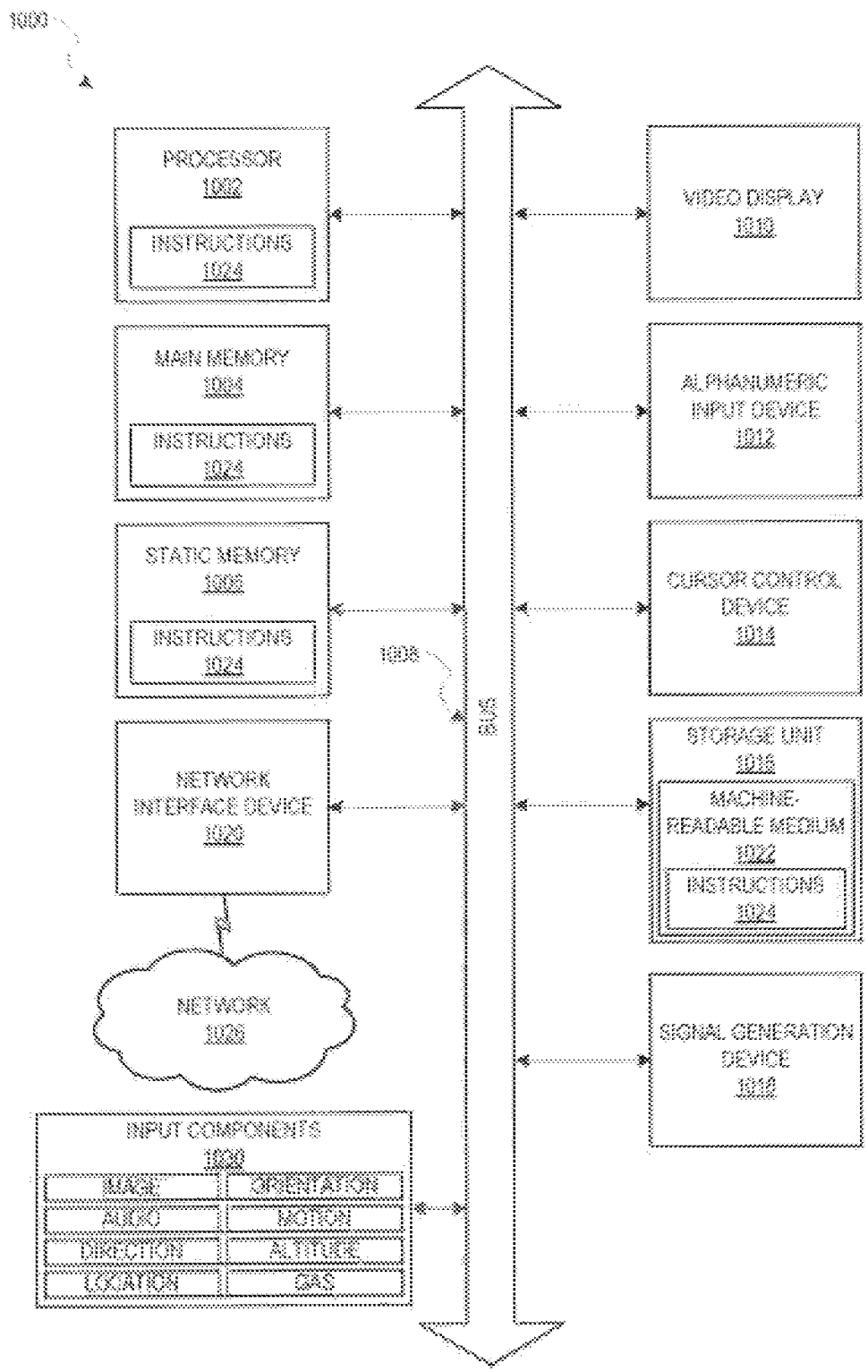
FIG. 10 illustrates a diagrammatic representation of a machine in the form of a computer system within which a set of instructions may be executed for causing the machine to perform any one or more of the methodologies discussed herein, according to an example embodiment.

FIG. 10 is a block diagram illustrating components of a machine 1000, according to some example embodiments, able to read instructions from a machine-readable medium (e.g., a machine-readable storage medium) and perform any one or more of the methodologies discussed herein. Specifically, FIG. 10 shows a diagrammatic representation of the machine 1000 in the example form of a computer system, within which instructions 1024 (e.g., software, a program, an application, an applet, an app, or other executable code) for causing the machine 1000 to perform any one or more of the methodologies discussed herein may be executed. In alternative embodiments, the machine 1000 operates as a standalone device or may be connected (e.g., networked) to other machines. In a networked deployment, the machine 1000 may operate in the capacity of a server machine or a client machine in a server-client network environment, or as a peer machine in a peer-to-peer (or distributed) network environment. The machine 1000 may be a server computer, a client computer, a personal computer (PC), a tablet computer, a laptop computer, a netbook, a set-top box (STB), a personal digital assistant (PDA), a cellular telephone, a smartphone, a web appliance, a network router, a network switch, a network bridge, or any machine capable of executing the instructions 1024, sequentially or otherwise, that specify actions to be taken by that machine. Further, while only a single machine 1000 is illustrated, the term "machine" shall also be taken to include a collection of machines 1000 that individually or jointly execute the instructions 1024 to perform any one or more of the methodologies discussed herein.

The machine 1000 includes a processor 1002 (e.g., a central processing unit (CPU), a graphics processing unit (GPU), a digital signal processor (DSP), an application specific integrated circuit (ASIC), a radio-frequency integrated circuit (RFIC), or any suitable combination thereof), a main memory 1004, and a static memory 1006, which are configured to communicate with each other via a bus 1008. The machine 1000 may further include a video display 1010 (e.g., a plasma display panel (PDP), a light emitting diode (LED) display, a liquid crystal display (LCD), a projector, or a cathode ray tube (CRT)). The machine 1000 may also include an alphanumeric input device 1012 (e.g., a keyboard), a cursor control device 1014 (e.g., a mouse, a touchpad, a trackball, a joystick, a motion sensor, or other pointing instrument), a storage unit 1016, a signal generation device 1018 (e.g., a speaker), and a network interface device 1020.

The storage unit 1016 includes a machine-readable medium 1022 on which is stored the instructions 1024 embodying any one or more of the methodologies or functions described herein. The instructions 1024 may also reside, completely or at least partially, within the main memory 1004, within the static memory 1006, within the processor 1002 (e.g., within the processor's cache memory), or all three, during execution thereof by the machine 1000. Accordingly, the main memory 1004, static memory 1006 and the processor 1002 may be considered as machine-readable media 1022. The instructions 1024 may be transmitted or received over a network 1026 via the network interface device 1020.

In some example embodiments, the machine 1000 may be a portable computing device, such as a smart phone or tablet computer, and have one or more additional input components 1030 (e.g., sensors or gauges). Examples of such input components 1030 include an image input component (e.g., one or more cameras, an audio input component (e.g., one or more microphones), a direction input component (e.g., a compass), a location input component (e.g., a global positioning system (GPS) receiver), an orientation component (e.g., a gyroscope), a motion detection component (e.g., one or more accelerometers), an altitude detection component (e.g., an altimeter), and a gas detection component (e.g., a gas sensor). Inputs harvested by any one or more of these input components 1030 may be accessible and available for use by any of the modules described herein.

As used herein, the term "memory" refers to a machine-readable medium 1022 able to store data temporarily or permanently and may be taken to include, but not be limited to, random-access memory (RAM), read-only memory (ROM), buffer memory, flash memory, and cache memory. While the machine-readable medium 1022 is shown in an example embodiment to be a single medium, the term "machine-readable medium" should be taken to include a single medium or multiple media (e.g., a centralized or distributed database, or associated caches and servers) able to store instructions 1024. The term "machine-readable medium" shall also be taken to include any medium, or combination of multiple media, that is capable of storing instructions (e.g., instructions 1024) for execution by a machine (e.g., machine 1000), such that the instructions, when executed by one or more processors of the machine 1000 (e.g., processor 1002), cause the machine 1000 to perform any one or more of the methodologies described herein. Accordingly, a "machine-readable medium" refers to a single storage apparatus or device, as well as "cloud-based" storage systems or storage networks that include multiple storage apparatus or devices. The term "machine-readable medium" shall accordingly be taken to include, but not be limited to, one or more data repositories in the form of a solid-state memory, an optical medium, a magnetic medium, or any suitable combination thereof. The term "machine-readable medium" specifically excludes non-statutory signals per se.

Furthermore, the machine-readable medium 1022 is non-transitory in that it does not embody a propagating signal. However, labeling the machine-readable medium 1022 as "non-transitory" should not be construed to mean that the medium is incapable of movement; the medium should be considered as being transportable from one physical location to another. Additionally, since the machine-readable medium 1022 is tangible, the medium may be considered to be a machine-readable device.

The instructions 1024 may further be transmitted or received over a communications network 1026 using a transmission medium via the network interface device 1020 and utilizing any one of a number of well-known transfer protocols (e.g., hypertext transfer protocol (HTTP)). Examples of communication networks include a local area network (LAN), a wide area network (WAN), the Internet, mobile telephone networks (e.g. 3GPP, 4G LTE, 3GPP2, GSM, UMTS/HSPA, WiMAX, and others defined by various standard setting organizations), plain old telephone service (POTS) networks, and wireless data networks (e.g., WiFi and BlueTooth networks). The term "transmission medium" shall be taken to include any intangible medium that is capable of storing, encoding, or carrying instructions 1024 for execution by the machine 1000, and includes digital or analog communications signals or other intangible medium to facilitate communication of such software.

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

Certain embodiments are described herein as including logic or a number of components, modules, or mechanisms. Modules may constitute either software modules (e.g., code embodied on a machine-readable medium 1022 or in a transmission signal) or hardware modules. A "hardware module" is a tangible unit capable of performing certain operations and may be configured or arranged in a certain physical manner. In various example embodiments, one or more computer systems (e.g., a standalone computer system, a client computer system, or a server computer system) or one or more hardware modules of a computer system (e.g., a processor or a group of processors) may be configured by software (e.g., an application or application portion) as a hardware module that operates to perform certain operations as described herein.

In some embodiments, a hardware module may be implemented mechanically, electronically, or any suitable combination thereof. For example, a hardware module may include dedicated circuitry or logic that is permanently configured to perform certain operations. For example, a hardware module may be a special-purpose processor, such as a field-programmable gate array (FPGA) or an ASIC. A hardware module may also include programmable logic or circuitry that is temporarily configured by software to perform certain operations. For example, a hardware module may include software encompassed within a general-purpose processor or other programmable processor. It will be appreciated that the decision to implement a hardware module mechanically, in dedicated and permanently configured circuitry, or in temporarily configured circuitry (e.g., configured by software) may be driven by cost and time considerations.

Accordingly, the phrase "hardware module" should be understood to encompass a tangible entity, be that an entity that is physically constructed, permanently configured (e.g., hardwired), or temporarily configured (e.g., programmed) to operate in a certain manner or to perform certain operations described herein. As used herein, "hardware-implemented module" refers to a hardware module. Considering embodiments in which hardware modules are temporarily configured (e.g., programmed), each of the hardware modules need not be configured or instantiated at any one instance in time. For example, where a hardware module comprises a general-purpose processor configured by software to become a special-purpose processor, the general-purpose processor may be configured as respectively different special-purpose processors (e.g., comprising different hardware modules) at different times. Software may accordingly configure a processor 1002, for example, to constitute a particular hardware module at one instance of time and to constitute a different hardware module at a different instance of time.

Hardware modules can provide information to, and receive information from, other hardware modules. Accordingly, the described hardware modules may be regarded as being communicatively coupled. Where multiple hardware modules exist contemporaneously, communications may be achieved through signal transmission (e.g., over appropriate circuits and buses) between or among two or more of the hardware modules. In embodiments in which multiple hardware modules are configured or instantiated at different times, communications between such hardware modules may be achieved, for example, through the storage and retrieval of information in memory structures to which the multiple hardware modules have access. For example, one hardware module may perform an operation and store the output of that operation in a memory device to which it is communicatively coupled. A further hardware module may then, at a later time, access the memory device to retrieve and process the stored output. Hardware modules may also initiate communications with input or output devices, and can operate on a resource (e.g., a collection of information).

The various operations of example methods described herein may be performed, at least partially, by one or more processors 1002 that are temporarily configured (e.g., by software) or permanently configured to perform the relevant operations. Whether temporarily or permanently configured, such processors 1002 may constitute processor-implemented modules that operate to perform one or more operations or functions described herein. As used herein, "processor-implemented module" refers to a hardware module implemented using one or more processors 1002.

Similarly, the methods described herein may be at least partially processor-implemented, with a processor 1002 being an example of hardware. For example, at least some of the operations of a method may be performed by one or more processors 1002 or processor-implemented modules. Moreover, the one or more processors 1002 may also operate to support performance of the relevant operations in a "cloud computing" environment or as a "software as a service" (SaaS). For example, at least some of the operations may be performed by a group of computers (as examples of machines 1000 including processors 1002), with these operations being accessible via the network 1026 (e.g., the Internet) and via one or more appropriate interfaces (e.g., an application program interface (API)).

The performance of certain of the operations may be distributed among the one or more processors 1002, not only residing within a single machine 1000, but deployed across a number of machines 1000. In some example embodiments, the one or more processors 1002 or processor-implemented modules may be located in a single geographic location (e.g., within a home environment, an office environment, or a server farm). In other example embodiments, the one or more processors 1002 or processor-implemented modules may be distributed across a number of geographic locations.

Although an overview of the inventive subject matter has been described with reference to specific example embodiments, various modifications and changes may be made to these embodiments without departing from the broader scope of embodiments of the present disclosure. Such embodiments of the inventive subject matter may be referred to herein, individually or collectively, by the term "invention" merely for convenience and without intending to voluntarily limit the scope of this application to any single disclosure or inventive concept if more than one is, in fact, disclosed.

The embodiments illustrated herein are described in sufficient detail to enable those skilled in the art to practice the teachings disclosed. Other embodiments may be used and derived therefrom, such that structural and logical substitutions and changes may be made without departing from the scope of this disclosure. The Detailed Description, therefore, is not to be taken in a limiting sense, and the scope of various embodiments is defined only by the appended claims, along with the full range of equivalents to which such claims are entitled.

As used herein, the term "or" may be construed in either an inclusive or exclusive sense. Moreover, plural instances may be provided for resources, operations, or structures described herein as a single instance. Additionally, boundaries between various resources, operations, modules, engines, and data stores are somewhat arbitrary, and particular operations are illustrated in a context of specific illustrative configurations. Other allocations of functionality are envisioned and may fall within a scope of various embodiments of the present disclosure. In general, structures and functionality presented as separate resources in the example configurations may be implemented as a combined structure or resource. Similarly, structures and functionality presented as a single resource may be implemented as separate resources. These and other variations, modifications, additions, and improvements fall within a scope of embodiments of the present disclosure as represented by the appended claims. The specification and drawings are, accordingly, to be regarded in an illustrative rather than a restrictive sense.

What is claimed is:

1. A method comprising:
receiving, by one or more processors, an image file representing a payment item;
determining, by the one or more processors, an improvement to an image capture aspect associated with the image file to better represent the payment item based on detecting the payment item in a scene captured by the image file and analyzing the image file based on detection of the payment item; and
generating, by the one or more processors, feedback based on the improvement.

2. The method of claim 1, wherein the receiving comprises receiving the image file via an image capture device.

3. The method of claim 1, wherein the payment item comprises a credit card, a check, a driver's license, a hologram, or an item with reflective paint.

4. The method of claim 1, wherein the improvement is to an image quality or a composition of the image file, and the feedback includes a camera setting adjustment.

5. The method of claim 4, wherein the feedback relates to controlling at least one of a light condition, an orientation of an image capture device relative to the payment item, a direction of the image capture device relative to the payment item, or a distance between the image capture device and the payment item.

6. The method of claim 1, wherein the one or more processors are included in a smart phone and the image file is received via an image capture device of the smart phone.

7. The method of claim 6, further comprising outputting, by the smart phone, the feedback while the image capture device is being used to capture images.

8. The method of claim 7, wherein the feedback comprises at least one of displaying information, audio feedback, or tactile feedback.

9. The method of claim 1, wherein the feedback indicates that a number of the payment item is captured as a different number in the image file.

10. A system comprising:
one or more processors; and
memory storing instructions that, when executed by the one or more processors, cause the system to perform operations comprising:
receiving an image file representing a payment item;
determining an improvement to an image capture aspect associated with the image file to better represent the payment item based on detecting the payment item in a scene captured by the image file and analyzing the image file based on detection of the payment item; and
generating feedback based on the improvement.

11. The system of claim 10, further comprising an image capture device, wherein the image file is received via the image capture device.

12. The system of claim 11, wherein the operations further comprise outputting the feedback while the image capture device is being used to capture images.

13. The system of claim 10, wherein the payment item includes a credit card, a check, a driver's license, a hologram, or an item with reflective paint.

14. The system of claim 10, wherein the improvement is to an image quality or a composition of the image file, and the feedback includes a camera setting adjustment.

15. The system of claim 14, wherein the feedback relates to controlling at least one of a light condition, an orientation of an image capture device relative to the payment item, a direction of the image capture device relative to the payment item, or a distance between the image capture device and the payment item.

16. A non-transitory machine-readable medium comprising instructions that when executed by one or more processors cause a system to perform operations comprising:
receiving an image file representing a payment item;
determining an improvement to an image capture aspect associated with the image file to better represent the payment item based on detecting the payment item in a scene captured by the image file and analyzing the image file based on detection of the payment item; and
generating feedback based on the improvement.

17. The non-transitory machine-readable medium of claim 16, wherein the receiving comprises receiving the image file via an image capture device.

18. The non-transitory machine-readable medium of claim 16, wherein the payment item includes a credit card, a check, a driver's license, a hologram, or an item with reflective paint.

19. The non-transitory machine-readable medium of claim 16, wherein the improvement is to an image quality or a composition of the image file, and the feedback includes a camera setting adjustment.

20. The non-transitory machine-readable medium of claim 19, wherein the feedback relates to controlling at least one of a light condition, an orientation of an image capture device relative to the payment item, a direction of the image capture device relative to the payment item, or a distance between the image capture device and the payment item.

* * * * *